United States Patent [19]

Oaks

[11] 4,064,617

[45] Dec. 27, 1977

[54] DIE ASSEMBLY AND METHOD FOR CLINCHING FASTENERS TO PANELS

[75] Inventor: Daniel V. Oaks, Lindenhurst, Ill.

[73] Assignee: MacLean-Fogg Lock Nut Company, Mundelein, Ill.

[21] Appl. No.: 719,803

[22] Filed: Sept. 1, 1976

[51] Int. Cl.² ............................................. B23P 11/00
[52] U.S. Cl. .................................. 29/432.1; 29/283.5; 29/432; 29/798; 72/357
[58] Field of Search ..................... 29/798, 243.53, 432, 29/283.5, 716, 432.1, 432.2; 151/41.72; 72/357

[56] References Cited

U.S. PATENT DOCUMENTS

| | | | |
|---|---|---|---|
| 2,652,942 | 9/1953 | Muchy | 29/509 |
| 2,749,606 | 6/1956 | Donahue | 29/432 |
| 2,750,660 | 6/1956 | Newcomb | 29/432 |
| 3,337,946 | 8/1967 | Anderson et al. | 29/432.1 |
| 3,877,133 | 4/1975 | Grube | 29/432.2 |
| 3,921,276 | 11/1975 | Oaks | 29/798 |

*Primary Examiner*—Victor A. DiPalma
*Attorney, Agent, or Firm*—Mason, Kolehmainen, Rathburn & Wyss

[57] ABSTRACT

A die assembly for clinching a fastener such as a pierce nut to a panel. In the clinching operation, a pilot portion of the fastener is driven through the panel and into an aperture in a die body. Step portions of the die body deform the fastener pilot and interlock or clinch the fastener and panel together. After the clinching operation, the fastener and panel are stripped from the die assembly. In order to facilitate release of the fastener pilot from the die aperture, the die body is segmented so that its segments can separate in a radial direction to enlarge the aperture. The die body segments have sloping outer surfaces received in a complementary die holder so that the segments are cammed together during the clinching operation and are separable during the stripping operation.

9 Claims, 5 Drawing Figures

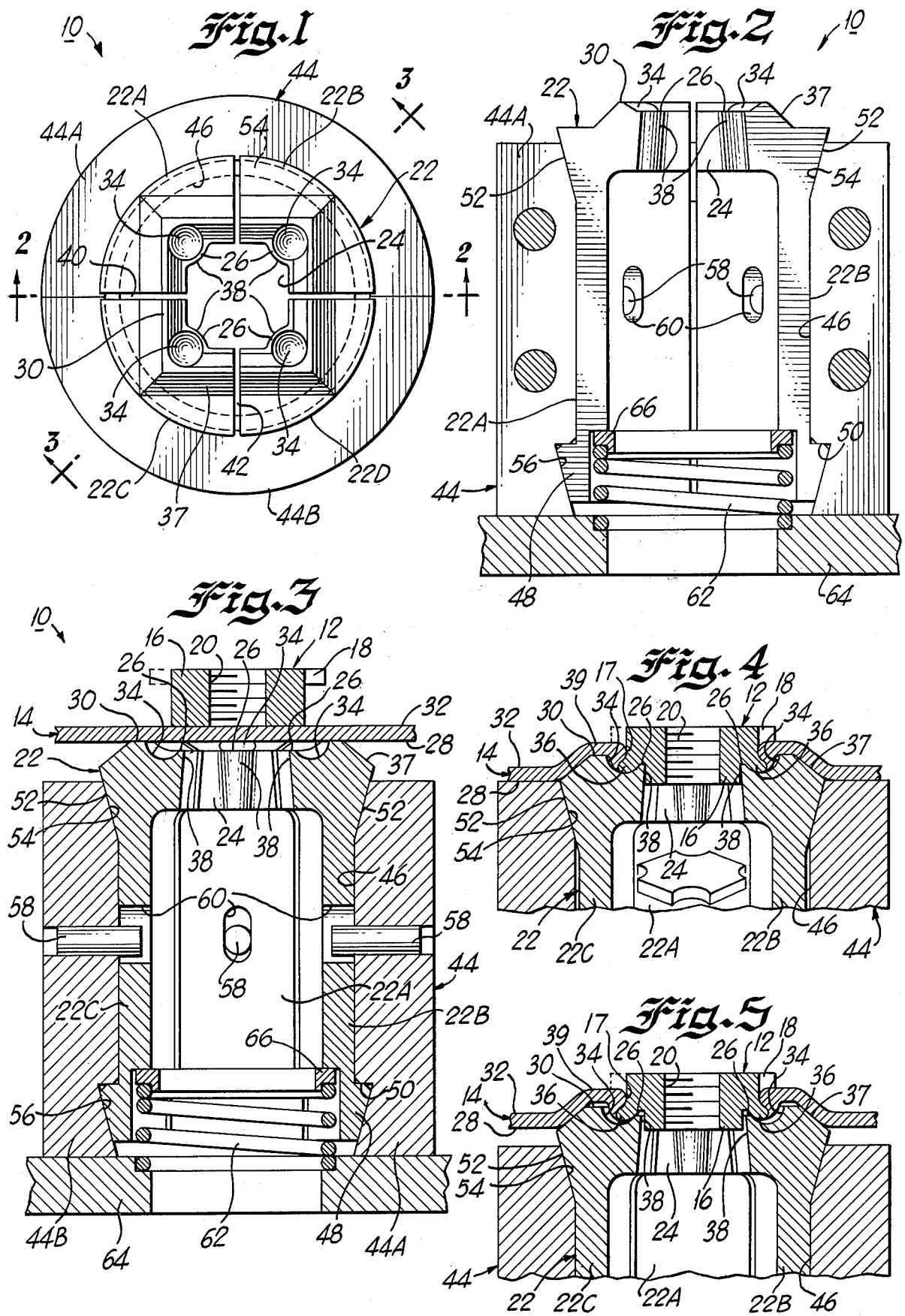

DIE ASSEMBLY AND METHOD FOR CLINCHING FASTENERS TO PANELS

The present invention relates to improvements in a die assembly and to a method for clinching fasteners such as pierce nuts to a panel.

Several types of fasteners are known which are attached by clinching to a panel such as a sheet metal panel. An example of such a fastener is the pierce nut in strip form disclosed in pending United States patent application Ser. No. 423,188, filed Dec. 10, 1973 now U.S. Pat. No. 3,999,659 — Grube. This fastener is a nut having a pilot portion for piercing a sheet metal panel and having a flanged end adapted to abut the panel when the fastener is fully seated. Among the other types of clinch mounted fasteners are those which are inserted into preformed panel holes rather than piercing their own holes.

The clinching of a fastener such as a pierce nut to a sheet metal panel may be accomplished by driving the pilot portion of a fastener into an aperture in a die body located beneath the panel. The die body includes structure for deforming the fastener pilot thereby to produce a clinch or interlock between the panel and the fastener. The die body can perform an additional function of flexing or shaping the panel to increase retention of the fastener in the panel and to locate the fastener in a desired position relative to the plane of the panel. More detailed descriptions of methods for accomplishing clinching of a fastener such as a pierce nut may be found in U.S. Pat. Nos. 3,877,133 — Grube and 3,693,237 — Grube.

After the clinching of the fastener to the sheet metal panel, the assembled panel and fastener are removed or stripped from the die. In some instances it has been found that an undesirably large stripping force may be required to separate the assembled fastener and panel from the die. This problem, for example, has been found to occur in the mounting of pierce nuts to relatively thin sheet metal panels. It is believed that this problem arises because of the depth of penetration of the fastener pilot through the panel, and because the die may be slightly deformed after a period of use with the result that an interference results between the die and the fastener pilot portion.

Among the important objects of the present invention are to provide an improved die assembly and an improved method for the clinching of fasteners such as pierce nuts to panels such as sheet metal panels; to provide a die assembly and a method for facilitating release of a fastener pilot portion from a die aperture; to provide a die assembly and a method making possible a uniform and relatively low stripping load even after an extended period of operation; and to provide an improved pierce nut die assembly and method capable of being economically manufactured and used.

In brief, in accordance with the present invention, there is provided an improved die assembly for use in clinching a fastener such as a pierce nut to a panel such as a sheet metal panel. The die assembly is used to support the back surface of a panel in a clinching operation during which a pilot portion of a fastener is driven through the panel and clinched to the panel. The die assembly includes a die body having an aperture for receiving the fastener pilot and having structure for deforming the pilot into clinching engagement with the panel.

In accordance with the present invention, the die body is segmented so that the die segments may spread radially apart in order to release the fastener pilot when the fastener and panel are stripped from the die assembly. In accordance with a further feature of the invention, the die segments and a cooperating holder are provided with cooperating camming surfaces to the end that the segments are cammed together during the clinching operation and are capable of being separated from one another during the stripping operation.

The present invention together with the above and other objects and advantages thereof may be best understood from the following detailed description of the embodiment of the invention illustrated in the accompanying drawings, wherein:

FIG. 1 is a top plan view of a die assembly constructed in accordance with the present invention and capable of performing the method of the present invention;

FIG. 2 is a sectional view of the die assembly taken along the line 2—2 of FIG. 1;

FIG. 3 is a sectional view taken along the line 3—3 of FIG. 1, illustrating the die assembly together with a portion of the panel and a fastener prior to a clinching operation;

FIG. 4 is a fragmentary view similar to part of FIG. 3 illustrating the die assembly, panel and fastener at the completion of a clinching operation; and FIG. 5 is a view similar to FIG. 4 illustrating the die assembly, the panel and the fastener during the stripping operation.

Having reference now to the drawings, there is illustrated a die assembly constructed in accordance with the principles of the present invention and designated in its entirety by the reference numeral 10. The die assembly 10 is used in attaching a fastener 12 to a sheet metal panel 14 in a clinching operation.

In the illustrated embodiment of the invention, the fastener 12 is a pierce nut including a projecting pilot portion 16 of generally rectangular or square shape. The pilot portion 16 pierces its own opening 17 through the sheet metal panel 14. Flanges 18 formed at the end of the pierce nut 12 are adapted to engage the panel surface upon complete insertion of the nut. As illustrated, the nut 12 may have a threaded axial opening 20.

The principles of the present invention are applicable to the mounting of fasteners of many types to panels with various clinching methods. For example, features of the invention may be applied to the mounting of fasteners generally known as clinch nuts which are inserted through preformed panel holes. Details of the structure of the fastener 12 and of the clinching method are not necessary to a complete understanding of the present invention. Detailed descriptions of the fastener and the clinching methods may be found in U.S. Pat. Nos. 3,693,237 and 3,877,133 and in copending U.S. patent application Ser. No. 423,188 filed Dec. 10, 1973, the disclosures of which are incorporated herein by reference.

The die assembly 10 of the present invention includes a die body generally designated as 22 defining a central, axially extending aperture 24 for receiving the pilot 16 of the fastener 12 during a clinching operation. A number of step portions 26 of the die body 22 serve to deform the pilot 16 thereby to create a clinch interconnection between the panel 14 and the fastener 12. In the illustrated arrangement there are four step portions 26 corresponding with the corners of pilot 16, although this specific configuration is not required.

Having reference to FIG. 3, in carrying out a clinching operation, the panel 14 is placed over the die body 22. The back surface 28 of the panel 14 is placed against a rim portion 30 of the die body 22. The fastener 12 is then aligned with the panel 14 and the die body 22. The fastener 12 is then driven against the front surface 32 of panel 14, through the panel, and into the aperture 24.

As the pilot portion 16 enters the aperture 24 in the die body 22, the corners of the pilot engage the step portions 26. These portions are provided with rounded or partly spherical-shaped recesses 34 for controlling the deformation of the fastener pilot portion 16 in such a manner that clinch interconnections 36 are formed to securely interlock the fastener 12 and the panel 14.

Rim 30 is surrounded by an inclined wall 37 on the die body 22. During the clinching operation the rim 30 and inclined wall 37 form a flexed area or boss 39 in the panel 14. The incline provides a wedging or snubbing action resisting pull through of the nut 12 from panel 14, and the boss 39 orients the bottom of nut 12 flush with the back surface 28 of the panel 14.

Step portions 26 are defined in part by walls 38 substantially parallel with or at a small angle relative to the axis of the aperture 24. Because the step portions deform the fastener pilot 16, there exists no clearance between the top edges of the walls 38 and the pilot 16 after the clinching operation. This absence of clearance can lead to difficulties in stripping the panel 14 and the fastener 12 from the die assembly 10 after the clinching operation.

More specifically, when a relatively thin panel is used, a substantial portion of the length of pilot portion 16 is driven through the panel during the piercing and clinching operation. In addition, the forces imparted to the die body 22 may tend to compress the step portions 26 downwardly after a period of use of the die assembly 10. It is believed that this may lead to a slight radial inward deformation or bulging of the walls 38. Such inwardly directed bulges cause an interference between the fastener pilot 16 and the walls 38 rendering release of the pilot portion from the aperture 24 difficult.

In accordance with an important feature of the present invention, the die body 22 is subdivided into a plurality of segments capable of being radially outwardly separated from one another in order to increase the size of aperture 24. In the illustrated arrangement, the die body 22 includes four similar quarter segments 22A, 22B, 22C and 22D. Thus, in this arrangement, the segments are separable from one another along a pair of perpendicular radial planes 40 and 42, and each of the quarter segments includes one of the step portions 26.

As best seen in FIG. 5, during the stripping operation the panel 14 and attached fastener 12 are removed from the die assembly 10 as by lifting the panel 14. The segments 22A, 22B, 22C and 22D are able to separate from one another in a radially outward direction so that problems resulting from interference between the die body 22 and pilot 16 are avoided. This separation increases the distance between the walls 38 and relieves any interference or tightness which may exist between the walls 38 and the pilot 16 of the fastener 12. In this manner, the release of the pilot 16 during the stripping operation may be accomplished with very little effort.

In accordance with another feature of the invention, the segments of the die body 22 are held by means of a die holder 44 in such a manner that the segments are firmly joined together during the clinching operation yet are permitted to separate during the stripping operation. Die holder 44 may include two parts 44A and 44B adapted to be fastened together in any desired manner and defining a central recess 46 for containing the die body 22. The die body 22 is movable in the axial direction within the opening 46 to a limited extent. Upward movement is limited by a flange portion 48 of the die body engageable with a shoulder 50 in the opening 46.

In order to tightly hold the segments of die body 22 together during a clinching operation, the outer surfaces of each of these segments 22A, 22B, 22C and 22D includes an inclined or sloping surface 52. In the illustrated arrangement, the surfaces 52 all coincide with a cone symmetric about the central axis of the die body 22, although this particular arrangement is not required. The die holder 44 is provided with a similarly sloped surface 54 comprising the end portion of the opening 46. When the die body 22 is urged into the die holder 44 by the panel prior to a clinching operation, the surfaces 52 and 54 interact to produce a camming action forcing the segments of the die body 22 radially inwardly.

Suitable structure may be provided for maintaining the segments of the die body 22 parallel and for preventing rotation. In the illustrated arrangement the flange portion 48 is sloped in a manner similar to surfaces 52, and flange 48 is received in an inclined section 56 of recess 46. Thus the upper and lower ends of segments 22A, 22B, 22C and 22D move inwardly and outwardly together. Rotation is prevented in any desired manner as by pins 58 received in slots 60 in the die body 22.

During the stripping operation, the segments of the die body 22 are able to separate from one another. A spring 62 is provided for moving the die body 22 in a direction to separate the surfaces 52 and 54. Any resistance encountered by the release of pilot portion 16 from the die body aperture 24 results in radially outward separation of the die body segments. Spring 62 is in compression between a base member 64 and a spring retainer 66 abutting the bottoms of segments 22A, 22B, 22C and 22D. In a particular application it may be found that the spring 62 is not required since the stripping motion of the panel 14 and fastener 12 may be sufficient to move the die body 22 within the die holder 44.

While the invention has been described with reference to details of the illustrated embodiment, it should be understood that such details are not intended to limit the scope of the present invention as defined in the appended claims.

What is claimed a desired to be secured by Letters Patent of the United States is:

1. A die assembly for clinching a fastener to a panel comprising:

a die body having an axially extending aperture and having a rim portion surrounding said aperture;

said die body including means in said aperture for deforming a fastener pilot driven therein;

said die body being subdivided into at least two segmental parts along at least one radial plane;

a die holder having an axial opening containing said die body; and said die holder and said die body having cooperating surfaces for camming said segments toward one another in response to axial movement of said die body in said axial opening.

2. The assembly of claim 1, said camming surfaces on said die holder and die body comprising conical surfaces.

3. A die assembly for use in a fastener attaching operation wherein a fastener having a pilot portion is inserted in a first direction through a sheet metal panel and into engagement with the die assembly on the opposite side of the panel, said die assembly comprising:
   a die body;
   an aperture in said die body for receiving the pilot portion;
   at least one step portion of said die body adjacent said aperture for deforming said pilot portion upon movement of said pilot portion into said aperture; and
   said die body including at least one portion movable laterally with respect to said first direction, said movable portion including at least part of said step portion.

4. A die assembly for use in a fastener clinching operation wherein a fastener having a cornered pilot portion is inserted in a first direction through a panel and into engagement with the die assembly on the opposite side of the panel, said die assembly comprising:
   a die body having a rim portion for supporting the panel;
   an axial aperture in said body surrounded by said rim portion and adapted to receive the pilot portion of the fastener;
   a clinching structure within said aperture on said body for deforming said pilot portion into clinching relation with the panel; and
   said die body being subdivided into a plurality of segments mounted for radially outward separation from one another.

5. The assembly of claim 4, each segment including a part of said clinching structure.

6. The assembly of claim 5, further comprising a die holder supporting said die body.

7. The assembly of claim 6, said die body segments and said die holder including interfacing camming surfaces for moving said segments radially together in response to pressure of the panel against said rim.

8. A method of attaching a fastener having a pilot portion to a sheet metal panel, said method including the steps of:
   supporting the back surface of the panel with an apertured die assembly;
   punching the pilot portion of the fastener through the panel from the front surface toward the back surface and into the die aperture;
   stripping the fastener and panel from the die assembly; and
   moving the walls of the die assembly aperture laterally outward to facilitate release of the pilot portion from the aperture.

9. A method of clinching a pierce nut to a panel comprising:
   positioning a segmented die body behind the panel;
   driving the pilot portion of the pierce nut through the panel and into an aperture in the die body;
   forcing the die body segments radially inwardly during said driving step with a force derived from the driving force;
   deforming the pilot with the die body during the driving step to form a clinch interconnection between the panel and the pierce nut;
   pulling the panel and nut axially away from the die body; and
   freeing the die body segments for radially outward movement during said pulling step.

* * * * *